United States Patent [19]
Williams et al.

[11] Patent Number: 5,853,046
[45] Date of Patent: Dec. 29, 1998

[54] HEAT EXCHANGER SEAL APPARATUS

[75] Inventors: Amanda L. Williams, Adrian; Bipin D. Parekh, Plymouth, both of Mich.

[73] Assignee: Ford Motor Company, Dearborn, Mich.

[21] Appl. No.: 787,507

[22] Filed: Jan. 21, 1997

[51] Int. Cl.⁶ .................................................... F28F 9/00
[52] U.S. Cl. ........................ 165/76; 277/637; 277/651
[58] Field of Search ........................ 165/76; 277/637, 277/561, 654; 49/492.1

[56] References Cited

U.S. PATENT DOCUMENTS

| | | | |
|---|---|---|---|
| 2,546,049 | 3/1951 | Weaver et al. | 277/637 |
| 3,795,274 | 3/1974 | Fieni . | |
| 4,158,757 | 6/1979 | Reichert et al. | 200/302 |
| 4,295,521 | 10/1981 | Sommars . | |
| 4,306,615 | 12/1981 | Bolton et al. . | |
| 4,914,929 | 4/1990 | Shimazaki . | |
| 5,036,931 | 8/1991 | Iritani . | |
| 5,163,505 | 11/1992 | Hoffman et al. . | |
| 5,289,658 | 3/1994 | Lusen et al. | 49/492.1 |
| 5,355,941 | 10/1994 | Blankenberger et al. . | |
| 5,372,184 | 12/1994 | Joseph et al. . | |

*Primary Examiner*—Allen Flanigan
*Attorney, Agent, or Firm*—Gregory P. Brown

[57] ABSTRACT

A sealing apparatus for a heat exchanger used in an automotive vehicle is disclosed. The seal apparatus includes a closed loop of rigid material (29), the loop defining four substantially orthogonal edges (28, 30, 32, 34) configured to contact the respective sides of the heat exchanger (12). A sealing member (27) of soft material is attached to an outer face (21) of the closed loop and adapted to sealingly engage walls of a housing containing the heat exchanger. The loop includes a plurality of locating pins (38) integrally formed in the closed loop for located and retaining the sealing apparatus in a predetermined relationship with the heat exchanger.

8 Claims, 2 Drawing Sheets

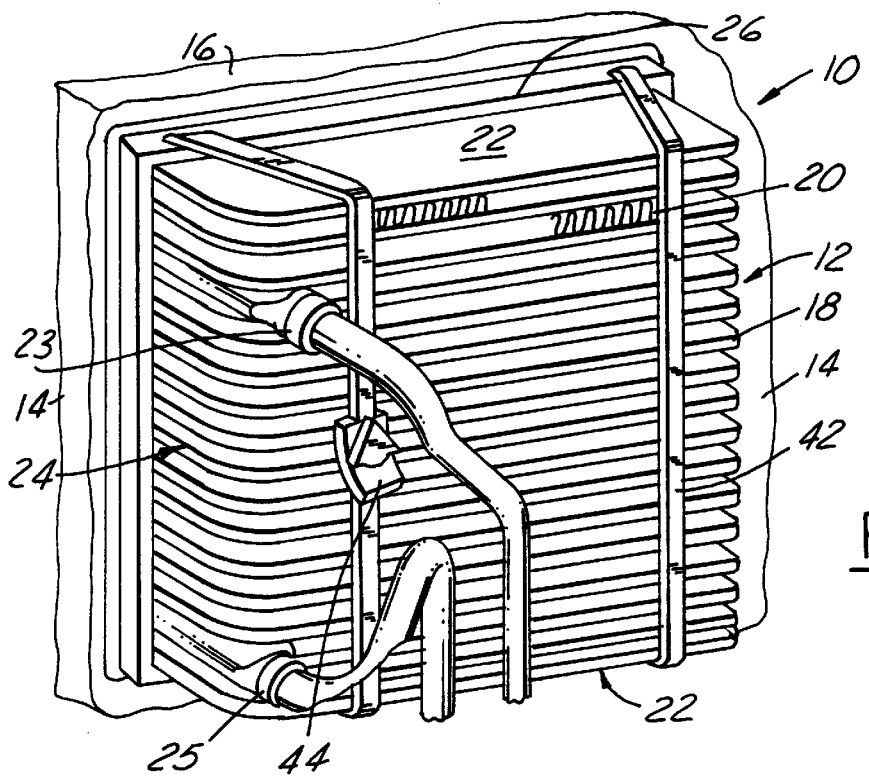
FIG. 1
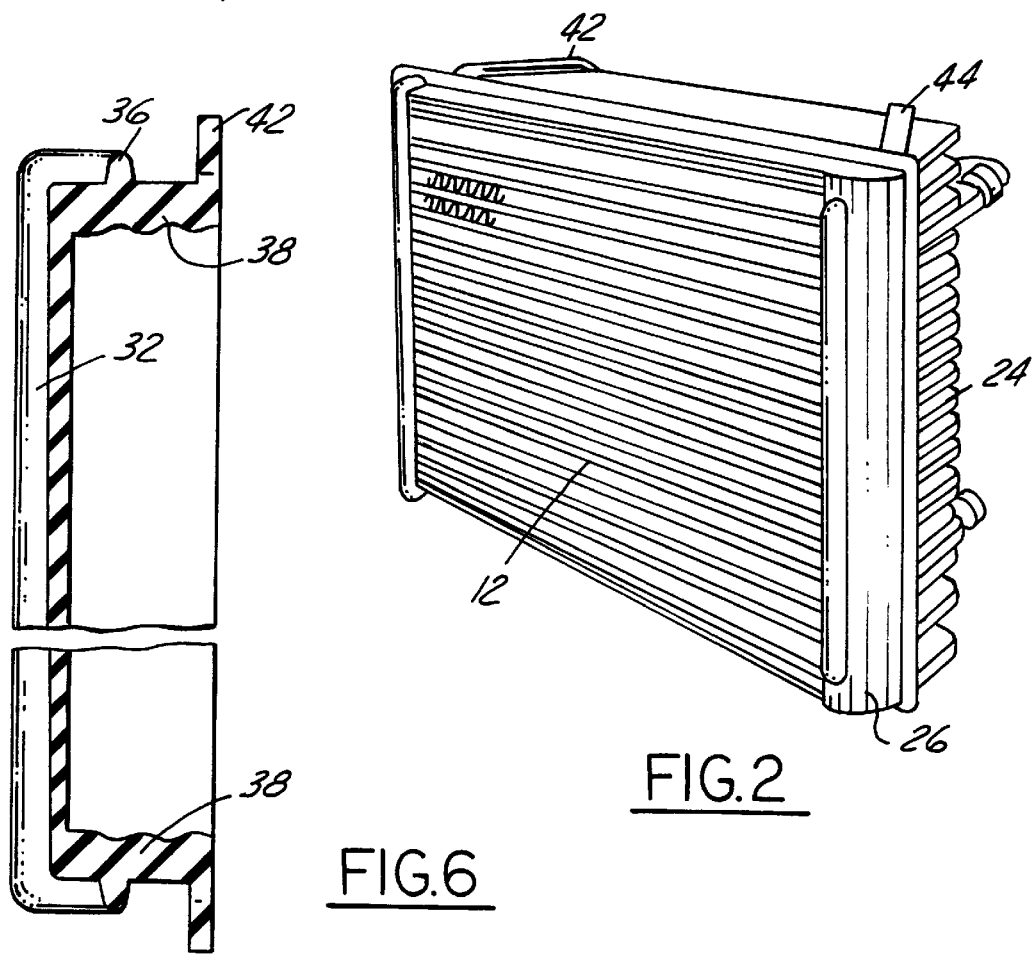
FIG. 6
FIG. 2

HEAT EXCHANGER SEAL APPARATUS

BACKGROUND OF THE INVENTION

1. Field of the Invention

The present invention relates generally to heat exchangers and more particularly to a seal surrounding the heat exchanger which prevents warm air from passing around the heat exchanger.

2. Background Information

Heat exchangers in the automotive industry, such as evaporators, generally are mounted in a casing within the passenger space or cabin of the motor vehicle. Typically, a seal surrounds the heat exchanger core to prevent warm air from passing around the heat exchanger which could produce condensation within the casing and to prevent noise generated by the leaking air. Activation of the air conditioning system could force this condensation into the passenger space of the vehicle. Obviously, this is an undesirable result and many methods have been proposed to provide better sealing around the heat exchanger core to prevent the occurrence or formation of condensation around the heat exchanger core. For example, U.S. Pat. No. 5,372,184, assigned to Ford Motor Company, the same assignee of the present invention, discloses one such seal for surrounding the radiator of an automotive vehicle, the seal comprising a closed loop of closed foamed cell material which is strapped to the heat exchanger prior to the heat exchanger being installed into a casing. A difficulty has been observed in the installation of this type of design, in that the seal can require extra operations to ensure proper alignment about the periphery of the exchanger. One solution to such a problem is to use an adhesive to provide additional retention of the seal to the heat exchanger during installation, but such a solution is undesirable from both a cost and processing standpoint. Adhesives present their own variety of problems, including applying an incorrect amount of adhesive, etc.

Therefore, it would be advantageous to provide a sealing apparatus for a heat exchanger which may be consistently and accurately positioned on a heat exchanger and then retained thereon through the process of installing the heat exchanger and seal in a housing.

SUMMARY OF THE INVENTION

The present invention overcomes the disadvantages of the prior art by providing a sealing apparatus for a heat exchanger used in an automotive vehicle, the heat exchanger having a plurality of interleaved fluid conducting tubes and fins which form a generally rectangular core defining a pair of orthogonal opposed sides. The heat exchanger is mounted in a casing comprising a housing having an open end for receiving the heat exchanger therethrough and a plurality of walls defining a volume for receiving the heat exchanger therein. The sealing apparatus comprises a closed loop of rigid material, the loop defining four substantially orthogonal edges, each edge configured to contact a respective side of the core of the heat exchanger. The sealing apparatus also includes a sealing member of soft material attached to an outer face of at least one edge of the closed loop not in contact with the heat exchanger, the sealing member being adapted to contacting the housing walls. The sealing apparatus further includes a plurality of locating pins integrally formed with and extending from an inner face of at least one edge of said closed loop in contact with the heat exchanger, the locating pins being disposed at predetermined locations on the closed loop, and adapted to engage the fins in said core to positively locate the closed loop in a correct position relative to the heat exchanger.

The present invention is particularly useful for surrounding an evaporator of an air conditioning system in an automotive vehicle. One advantage of the present invention is to provide a seal around a heat exchanger core which eliminates the use of adhesives to secure the seal to the heat exchanger core and which prevents warm air from passing around the evaporator core, as well as to mechanically isolate the core within the housing to reduce noise, vibration and harshness within the system.

These and other objects, features and advantages of the present invention will become apparent from the drawings, detailed description and claims which follow.

BRIEF DESCRIPTION OF THE DRAWINGS

FIG. 1 is a perspective view of a heat exchanger core provided with a sealing apparatus of the present invention and a casing of an automotive air conditioning system.

FIG. 2 is a perspective view of the heat exchanger core provided with a sealing apparatus of the present invention.

FIG. 6 is a cross-sectional view of the present invention taken along line 6—6 of FIG. 5.

DETAILED DESCRIPTION OF THE PREFERRED EMBODIMENTS

Figures 3, 4, 5:
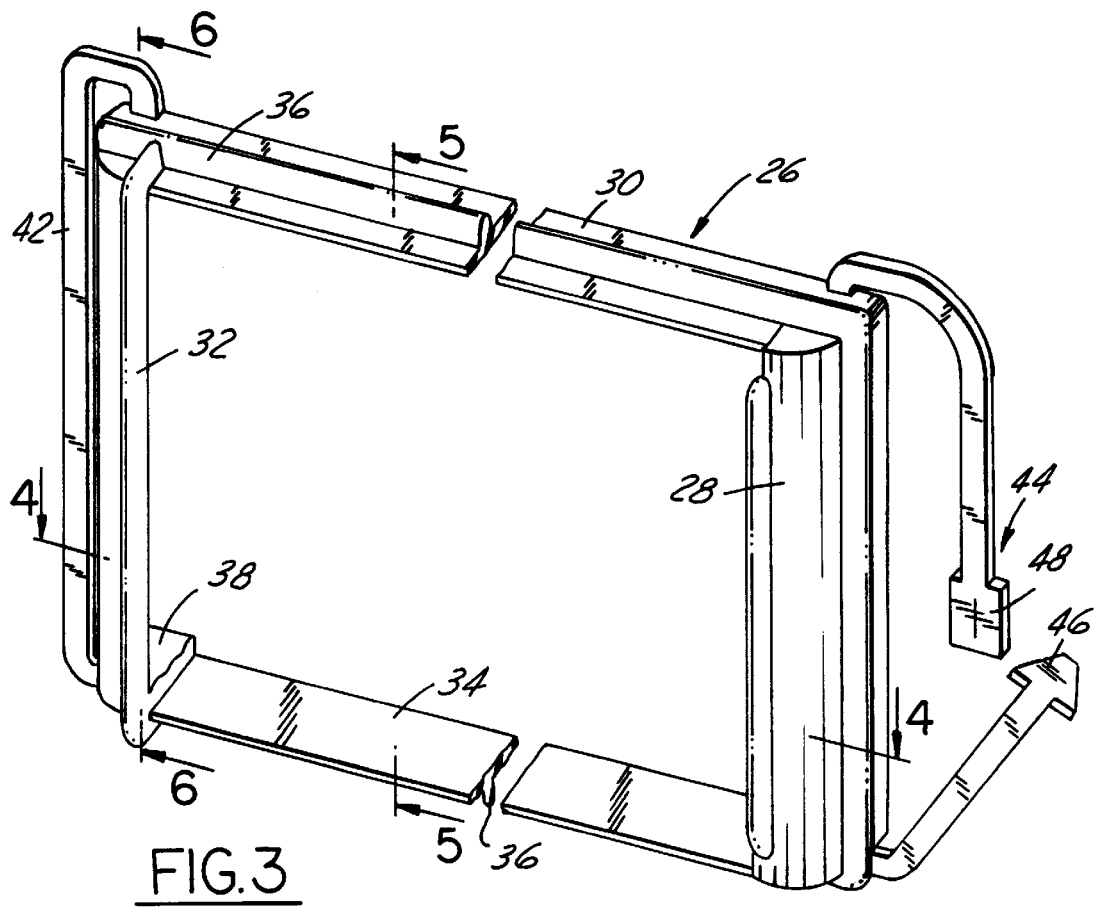
FIG. 3 is an exploded perspective view of the sealing apparatus of the present invention.
FIG. 4 is a cross-sectional view of the present invention taken along line 4—4 of FIG. 2.
FIG. 5 is a cross-sectional view of the present invention taken along line 5—5 of FIG. 2.

Referring now to the drawings, FIGS. 1 and 2 show a portion of a casing 10 of a heater or air conditioning assembly for the passenger space or cabin of a motor vehicle. The casing 10 may be located in the engine compartment area of the vehicle as well. The casing 10 is made of a molded plastic and receives a heat exchanger 12 therein. As is known in the art, the casing includes a plurality of walls 14 and defines an open end 16 at one end thereof for receiving the heat exchanger 12 therethrough.

As shown in FIG. 1, the heat exchanger 12 comprises an evaporator constructed in a known manner having a plurality of interleaved fluid conducting tubes or plates 18 and fins 20. The plurality of tubes 18 and fins 20 are fabricated to form a generally rectangular core thereby, the core defining a pair of generally orthogonal opposed sides 22, 24. As is further well known in the art, the evaporator includes an inlet port 23 and an outlet port 25 for supplying and removing fluid from the evaporator 12. As will be described in further detail below, a seal 26 according to the present invention surrounds the heat exchanger or evaporator 12 and is interposed between the sides 22, 24 thereof and the walls 14 of the casing 10.

Referring now to FIGS. 3 and 4, the seal 26 according to the present invention includes a sealing member 27 of soft material attached to an outer face 21 closed loop of rigid material 29 acting as a substrate for the sealing member 27. The closed loop defines four substantially orthogonal edges 28, 30, 32 and 34. Each of these edges 28, 30, 32, 34, contacts a respective side 22, 24 and the top and bottom of the evaporator 12 as shown in FIGS. 1 and 2. The closed loop is formed from a rigid, injection molded plastic, or a similar material known in the art by a known manufacturing process. The closed loop could also be cast aluminum or a variety of other materials having similarly rigid properties.

Each of the edges 28, 30, 32 and 34 of the closed loop 29 include a radially extending portion 53 and an axially extending portion 55. Together, when the evaporator is installed in the housing 14 the radially extending portion engages the housing and the axially extending portion supports the sealing member 27, thereby ensuring a close tolerance fit against each of the sides of the evaporator and the walls of the housing.

The sealing member 27 includes soft edges 31, 33, 35, 37 which may be die cut or molded from a closed cell foamed rubber such as EPDM rubber or a similar material known in the art by a known manufacturing process such as molding and then and bonded to the closed loop 29. Alternatively, the closed loop 29 and the sealing member 27 may be formed together in a two shot injection molding manufacturing process also known in the art of molding. The edges of the sealing member 27 include a sealing bead 36 disposed on an outer face of each edge. The sealing bead 36 contacts the interior of the casing walls 14 when the evaporator 12 is inserted into the casing 10 compresses to ensure a watertight seal around the periphery of the evaporator 12 and the inside face of the walls 14 of the casing 12. The sealing bead 36 prevents warm air from passing around the evaporator 12 to prevent the formation of any condensation within the casing 10.

As further shown in FIGS. 3, 5 and 6, the seal 26 includes a plurality of locating pins 38 disposed at predetermined locations on the closed loop. The pins 38 engage the fins 20 of the evaporator so that the seal 26 is correctly positioned around the evaporator 12. Additionally, the locating pins secure the seal 26 to the heat exchanger or evaporator through their interference fit within the fins 20. The pins 38 may take a variety of shapes to provide positive engagement with various fin designs, however, in the presently preferred embodiment, the pins 38 are integrally molded on an inner face 40 of the closed loop 29. The pins 38 include a planar member 42 having first and second edges 44, 46 extending from the inner face 40 of the closed loop to a terminal portion 48 of the planar member. The first and second edges 44, 46 may be tapered toward the terminal portion to reduce insertion efforts. The first and second edges may also be jagged, or otherwise not smooth to increase retention within the fins 20. By providing the locating pins 38 on the rigid closed loop and having the seal member 27 attached thereto, the seal 26 can be correctly positioned on the heat exchanger and require no further operator positioning or adjustment of the seal on the exchanger.

Various other modifications and permutations of the present invention should, no doubt, occur to those skilled in the art. For example, the material used to fabricate the seal of the present invention can be selected from many of a group of known flexible closed cell materials. Therefore, it is the following claims, including all equivalents, which define the scope of the invention.

What is claimed is:

1. A sealing apparatus for a heat exchanger used in an automotive vehicle, said sealing apparatus comprising:

a heat exchanger having a plurality of interleaved fluid conducting tubes and fins forming a generally rectangular core, said core defining a pair of generally orthogonally opposed sides;

a housing having an open end and a plurality of walls defining a volume for receiving the heat exchanger therein;

a closed loop of rigid material, said loop defining four substantially orthogonal edges, each edge being in contact with a respective side of said core of said heat exchanger;

a sealing member of soft material attached to an outer face of at least one edge of said closed loop not in contact with said heat exchanger, said sealing member being in contact with said housing walls; and a plurality of locating pins integrally formed with and extending from an inner face of at least one edge of said closed loop in contact with said heat exchanger, said locating pins being disposed at predetermined locations on said closed loop, and engaged in said fins of said core to positively locate said closed loop in a correct position relative to said heat exchanger.

2. A sealing apparatus according to claim 1, wherein said edges include radially extending portions adapted to contact said housing.

3. A sealing apparatus according to claim 1, wherein said locating pins further comprise a planar member having first and second edges extending from said inner face of said closed loop to a terminal portion of said planar member, said first and second edges being tapered toward said terminal portion.

4. A sealing apparatus according to claim 1, wherein said closed loop of rigid material is fabricated from a rigid injection molded plastic.

5. A sealing apparatus according to claim 1, wherein said sealing member of soft material is fabricated from a closed cell neoprene material.

6. A sealing apparatus according to claim 3, wherein said locating pins extend from said inner faces on each of said edges of said closed loop.

7. A sealing apparatus according to claim 1, wherein said sealing member of soft material is bonded to closed loop.

8. A sealing apparatus according to claim 1, wherein said sealing member of soft material is molded integrally with said closed loop.

* * * * *